United States Patent
Sreeramoju (10) Patent No.: US 11,805,094 B2
(45) Date of Patent: Oct. 31, 2023

(54) DYNAMIC IPSEC POLICIES

(71) Applicant: Nicira, Inc., Palo Alto, CA (US)

(72) Inventor: Akshay Kumar Sreeramoju, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 303 days.

(21) Appl. No.: 16/684,376

(22) Filed: Nov. 14, 2019

(65) Prior Publication Data

US 2020/0106739 A1  Apr. 2, 2020

Related U.S. Application Data (63) Continuation of application No. 14/992,310, filed on Jan. 11, 2016, now Pat. No. 10,505,891.

(60) Provisional application No. 62/142,459, filed on Apr. 2, 2015.

(51) Int. Cl.
*H04L 9/40* (2022.01)
*H04L 61/5014* (2022.01)
*H04L 101/622* (2022.01)

(52) U.S. Cl.
CPC ...... *H04L 61/5014* (2022.05); *H04L 63/0435* (2013.01); *H04L 63/205* (2013.01); *H04L 2101/622* (2022.05)

(58) Field of Classification Search
CPC ............. H04L 61/2015; H04L 61/6022; H04L 63/0435; H04L 63/205
See application file for complete search history.

(56) References Cited

U.S. PATENT DOCUMENTS

| | | | | |
|---|---|---|---|---|
| 6,862,286 | B1 ‡ | 3/2005 | Tams ................ | H04L 29/12018 370/395.32 |
| 6,990,101 | B1 ‡ | 1/2006 | Chow .................... | H04L 45/60 370/389 |
| 8,416,691 | B1 ‡ | 4/2013 | Haberman .......... | H04L 12/2876 370/235 |
| 9,801,052 | B2 ‡ | 10/2017 | Agiwal ................. | H04W 12/04 |
| 2004/0064688 | A1 ‡ | 4/2004 | Jacobs ................ | H04L 63/0245 713/150 |
| 2004/0103310 | A1 ‡ | 5/2004 | Sobel .................... | H04L 63/105 726/15 |
| 2004/0106403 | A1 * | 6/2004 | Mori ..................... | H04L 47/805 455/426.2 |
| 2005/0135625 | A1 ‡ | 6/2005 | Tanizawa ............. | H04L 63/0428 380/270 |
| 2006/0101262 | A1 ‡ | 5/2006 | Haney ................. | H04L 12/4633 713/153 |

(Continued)

FOREIGN PATENT DOCUMENTS

EP   2779531 A2 * 9/2014 ......... H04L 12/4641

*Primary Examiner* — Lynn D Feild
*Assistant Examiner* — Abdullah Almamun
(74) *Attorney, Agent, or Firm* — ADELI LLP (57) ABSTRACT

Some embodiments provide a method for securing communication of data messages of a particular machine that includes a dynamic first level address. The method identifies a fixed second level address for a particular data. The fixed second level address is associated with an interface of the particular machine. Based on the fixed second level address, the method identifies a set of security policies for securing the communication of the particular data message. The method applies the set of security policies to the particular data message.

13 Claims, 9 Drawing Sheets

(56) References Cited

U.S. PATENT DOCUMENTS

| | | | |
|---|---|---|---|
| 2006/0274899 A1‡ | 12/2006 | Zhu | H04L 9/083 380/281 |
| 2007/0038719 A1* | 2/2007 | Brown | H04L 63/126 709/207 |
| 2008/0148042 A1‡ | 6/2008 | Brown | H04L 63/0442 713/154 |
| 2009/0054037 A1‡ | 2/2009 | Kaippallimalil | H04L 63/08 455/411 |
| 2009/0106405 A1* | 4/2009 | Mazarick | H04L 41/0895 709/222 |
| 2009/0327691 A1‡ | 12/2009 | Kishore | H04L 63/0428 713/150 |
| 2010/0119069 A1‡ | 5/2010 | Kamikura | H04L 9/0841 380/255 |
| 2011/0299537 A1‡ | 12/2011 | Saraiya | H04L 61/2596 370/392 |
| 2011/0314177 A1‡ | 12/2011 | Harp | H04L 63/306 709/238 |
| 2012/0304254 A1* | 11/2012 | Musfeldt | H04W 12/02 726/2 |
| 2014/0086248 A1‡ | 3/2014 | Assarpour | H04L 45/748 370/392 |
| 2014/0280846 A1‡ | 9/2014 | Gourlay | H04L 41/00 709/223 |
| 2014/0297805 A1* | 10/2014 | Chaplot | H04L 65/65 709/219 |
| 2014/0304765 A1‡ | 10/2014 | Nakamoto | H04L 63/20 726/1 |
| 2015/0150073 A1‡ | 5/2015 | Bhalerao | H04L 63/20 726/1 |
| 2015/0372918 A1‡ | 12/2015 | Zhou | H04L 47/11 370/230 |
| 2016/0182408 A1‡ | 6/2016 | Jani | H04L 49/70 370/474 |
| 2016/0241475 A1‡ | 8/2016 | Wang | H04L 45/7453 |
| 2017/0078330 A1 | 3/2017 | Sreeramoju | |

\* cited by examiner
‡ imported from a related application

DYNAMIC IPSEC POLICIES

CLAIM OF BENEFIT TO PRIOR APPLICATIONS

This application is a continuation application of U.S. patent application Ser. No. 14/992,310, filed Jan. 11, 2016, now published as U.S. Patent Publication 2017/0078330. U.S. patent application Ser. No. 14/992,310 claims the benefit of U.S. Provisional Patent Application 62/142,459, filed Apr. 2, 2015. U.S. patent application Ser. No. 14/992, 310, now published as U.S. Patent Publication 2017/0078330, is incorporated herein by reference.

BACKGROUND

Internet Protocol Security (IPSEC) is a set of protocols for securing communications between different machines (e.g., hosts, routers, etc.) on a network. IPSEC policies establish a security protocol for communications between the different machines of the network by specifying a shared key and an encryption method to encrypt/decrypt data traveling between the machines. Contemporary machines apply IPSEC policies at Layer 3 (L3) address levels.

However, such policies are prone to unintended results in networks that use Dynamic Host Configuration Protocol (DHCP) to dynamically assign addresses to a machine. In some cases, dynamic addresses are assigned to the machines, independent from the maintenance of the active IPSEC policies of each machine, creating situations where the IPSEC policies need to be updated to reference newly assigned addresses of the machine. In such situations, communications between the machines may be disrupted when data addressed to the newly assigned address no longer matches with the correct IPSEC policy, which is still referencing a previously assigned address. Changes in the dynamic address require administrative action to correct the obsolete policy definitions. To avoid such administrative costs, administrators often use alternate approaches, such as avoiding DHCP altogether and rather assigning static (Internet Protocol) IP addresses to the interfaces of a machine.

BRIEF SUMMARY

In order to avoid the administrative costs of updating IPSEC policies associated with using dynamic IP addresses at the Layer 3 (L3) level, some embodiments apply security policies based on interface-specific addresses (e.g., media access control (MAC) addresses) at the Layer 2 (L2) level. The dynamic addresses (or first level addresses) are addresses that are assigned to a machine on the network. The dynamic, first level addresses may change with varying frequency, depending on the administration of the network, but it is not necessary that all of the first level addresses be dynamic. For example, a network may assign dynamic, first level addresses to some machines, while assigning static, unchanging, first level addresses to other machines.

The interface-specific addresses (or second level addresses) are fixed, unique addresses associated with each interface (e.g., NIC, vNIC, etc.) that connects a machine to a network. In some cases, the second level address is not only unique within the network, but is a universally unique address (e.g., a MAC address) assigned by the manufacturer of the interface.

In some embodiments, the dynamic first level addresses are L3 addresses (e.g., Internet Protocol (IP) addresses) assigned to the machine by a DHCP server on the network, while the fixed, interface-specific, second level addresses are MAC addresses for each interface on the machines. The examples provided in this document are described with reference to IP and MAC addresses, but it should be understood that the invention can be embodied in other specific forms without departing from the spirit of the invention.

The interfaces are for communicating data messages (e.g., Ethernet frames, Internet Protocol (IP) packets, Transmission Control Protocol (TCP) segments, User Datagram Protocol (UDP) datagrams, etc.) with other machines on the network. The interfaces of some embodiments are physical Network Interface Controllers (NICs) that connect a machine to a network, while in other embodiments, some or all of the machines are virtual machines, and the interfaces are identified for virtual NICs of the virtual machines. In some embodiments, a machine includes multiple interfaces that connect to different networks. For example, in some cases a first interface of the machine connects to a public network while a second interface connects to a private network, and each of the interfaces is associated with different first and second level addresses (e.g., IP and MAC addresses).

Some embodiments provide a method for securing the communication of data messages in a network. Rather than defining security policies based on dynamic first level addresses, the method of some embodiments defines security policies based on the second level addresses (e.g., source/destination MAC addresses) specified in the data messages. By defining security policies based on the second level addresses, an associated security policy can be applied to all traffic to/from a specified interface, regardless of any changes to the first level address for the machine. For example, in a network that assigns dynamic IP addresses to different machines, the method of some embodiments defines security policies based on MAC addresses specified in the incoming and outgoing data messages.

Once the security policies have been defined, the method of some embodiments processes data messages for a machine to identify a second level address for the data messages. The data messages include both incoming and outgoing data messages that the machine receives and sends from other machines on the network. The method of some embodiments identifies a second level address for a data message based on information stored in the data message (e.g., source/destination IP address, incoming/outgoing port, etc.). In some embodiments, the method identifies the second level address based on a first level address associated with the data message (e.g., when the method is performed by a router). The method of some embodiments processes each data message through a set of network protocols (e.g., TCP/IP) to identify the first and/or second level addresses of the packet.

Once the second level address has been identified, the method of some embodiments identifies a set of security policies for securing the communication of the data messages based on the second level address. In some embodiments, the set of security policies includes an encryption method and a shared key for encrypting the particular packet. The method then applies the set of security policies to the data message. The method applies the set of security policies by encrypting (or decrypting) at least a portion of the data message based on the encryption method and the shared key of the identified set of security policies.

By defining and applying security policies based on the second level addresses, administrators are able to avoid the administrative costs of having to update the security policies for every machine in a network each time new dynamic first level addresses are assigned to machines in the network (e.g., using Dynamic Host Configuration Protocol (DHCP)).

In some embodiments, the method uses multiple levels of security policies. In some embodiments, the different levels of security policies are based on the first and second level addresses associated with the interfaces of a machine. The method first checks for a security policy based on the first level address of the interface and only applies a policy based on the second level address when no policy is available for the first level address of the data message. In other embodiments, the method first checks for a policy based on the second level address of the interface and only applies a policy based on the first level address when no policy is available for the second level address of the data message. The method of some embodiments checks for the security policies for the first and second level addresses using separate sets of security tables that specify different security policies based on the different level address.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

In order to avoid the administrative costs of updating IPSEC policies associated with using dynamic IP addresses at the Layer 3 (L3) level, some embodiments apply security policies based on interface-specific addresses (e.g., media access control (MAC) addresses) at the Layer 2 (L2) level. The dynamic addresses (or first level addresses) are addresses that are assigned to a machine on the network. The dynamic, first level addresses may change with varying frequency, depending on the administration of the network, but it is not necessary that all of the first level addresses be dynamic. For example, a network may assign dynamic, first level addresses to some machines, while assigning static, unchanging, first level addresses to other machines.

The interface-specific addresses (or second level addresses) are fixed, unique addresses associated with each interface (e.g., NIC, vNIC, etc.) that connects a machine to a network. In some cases, the second level address is not only unique within the network, but is a universally unique address (e.g., a MAC address) assigned by the manufacturer of the interface.

In some embodiments, the dynamic first level addresses are L3 addresses (e.g., Internet Protocol (IP) addresses) assigned to the machine by a DHCP server on the network, while the fixed, interface-specific, second level addresses are MAC addresses for each interface on the machines. The examples provided in this document are described with reference to IP and MAC addresses, but it should be understood that the invention can be embodied in other specific forms without departing from the spirit of the invention.

The interfaces are for communicating data messages with other machines on the network. As used in this document, data messages refer to a collection of bits in a particular format sent across a network. It should be understood that the term data message may be used herein to refer to various formatted collections of bits that may be sent across a network, such as Ethernet frames, IP packets, TCP segments, UDP datagrams, etc. The examples below refer to packets, but it should be understood that the invention should not be limited to any specific format or type of data message.

The interfaces of some embodiments are physical Network Interface Controllers (NICs) that connect a machine to a network, while in other embodiments, some or all of the machines are virtual machines, and the interfaces are identified for virtual NICs of the virtual machines. In some embodiments, a machine includes multiple interfaces that connect to different networks. For example, in some cases a first interface of the machine connects to a public network while a second interface connects to a private network, and each of the interfaces is associated with first and second level addresses (e.g., IP and MAC addresses).

Some embodiments provide a method for securing the communication of data messages in a network. Rather than defining security policies based on dynamic first level addresses, the method of some embodiments defines security policies based on the second level addresses (e.g., source/destination MAC addresses) specified in the data messages. By defining security policies based on the second level addresses, an associated security policy can be applied to all traffic to/from a specified interface, regardless of any changes to the first level address for the machine. For example, in a network that assigns dynamic IP addresses to different machines, the method of some embodiments defines security policies based on MAC addresses specified in the incoming and outgoing data messages.

Once the security policies have been defined, the method of some embodiments processes data messages for a machine to identify a second level address for the data messages. The data messages include both incoming and outgoing data messages that the machine receives and sends from other machines on the network. The method of some embodiments identifies a second level address for a data message based on information stored in the data message (e.g., source/destination IP address, incoming/outgoing port, etc.). In some embodiments, the method identifies the second level address based on a first level address associated with the data message (e.g., when a router performs the method to apply security to a packet). The method of some embodiments processes each data message through a set of network protocols (e.g., TCP/IP) to identify the first and/or second level addresses of the packet.

Once the second level address has been identified, the method of some embodiments identifies a set of security policies for securing the communication of the data messages based on the second level address. In some embodiments, the set of security policies includes an encryption method and a shared key for encrypting the particular packet.

The method then applies the set of security policies to the data message. The method applies the set of security policies by encrypting (or decrypting) at least a portion of the data message based on the encryption method and the shared key of the identified set of security policies.

By defining and applying security policies based on the second level addresses, administrators are able to avoid the administrative costs of having to update the security policies for every machine in a network each time new dynamic first level addresses are assigned to machines in the network (e.g., using Dynamic Host Configuration Protocol (DHCP)).

The above description introduces a method for applying security policies in a network based on different level interface addresses. Several more detailed embodiments are described below. Section I describes examples of applying security policies based on second level addresses when sending and receiving data messages. Section II describes an electronic system with which some embodiments of the invention are implemented.

I. Security Policy Application

Figure 1:
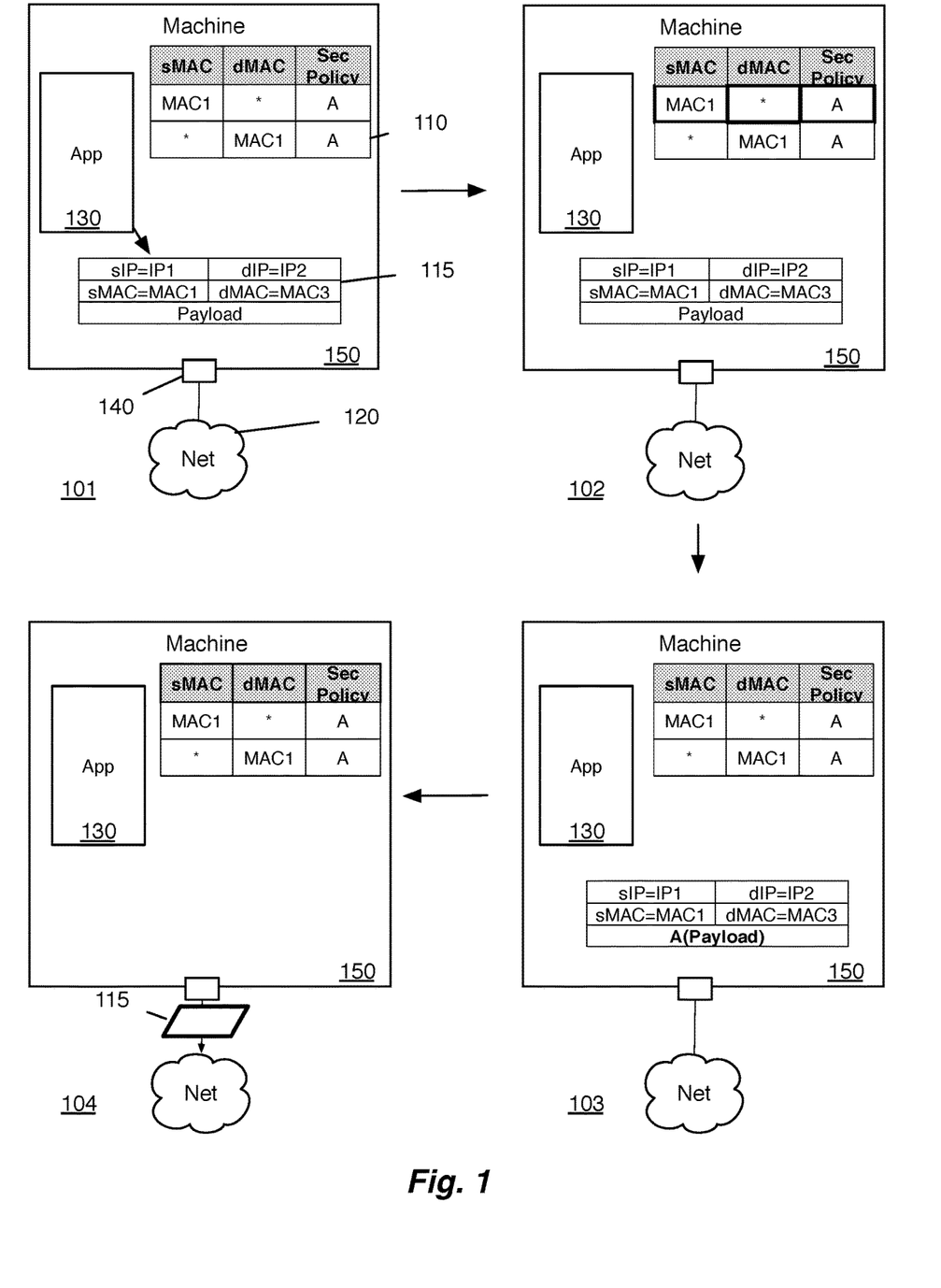
FIG. 1 illustrates an example of using security policies based on second level addresses to send data messages.

FIG. 1 illustrates an example of using security policies based on second level addresses (e.g., MAC addresses) to send data messages in four stages 101-104. In this example, machine 150 communicates with the network 120 over interface 140. Machine 150 represents any machine (e.g., host machine, router, virtual machine, etc.) in a network where security policies are applied to data messages.

Machine 150 includes an application 130, a packet 115, and a security policy table 110. Application 130 represents an application that executes on machine 150 that communicates with other machines (not shown) on the network 120. The packet 115 includes a source IP, a destination IP, a source MAC, a destination MAC, and a payload that carries the data of the packet. The IP addresses and the MAC addresses represent first and second level addresses (L3 and L2 respectively) for the packet 115.

The first stage 101 illustrates that application 130 of machine 150 generates a packet 115 to be sent out on the network 120. In the second stage 102, the machine 150 identifies a record in the security policy table 110 that matches with the packet 115. The security policy table 110 of some embodiments is defined based on source and destination MAC addresses. In this example, the packet 115 has a source MAC address of MAC1 and a destination MAC address of MAC3. MAC1 is the MAC address associated with interface 140 of machine 150, while MAC3 is the MAC address of an interface of another machine (e.g., a router, host machine, etc.) on the network 120.

Based on the source MAC address of the packet 115, the machine matches the packet 115 with the first record of the security policy table 110. The first record identifies a security policy A to be applied to packets with a source MAC address of MAC1. In this example, the security policy A specifies an encryption method and a shared key for encrypting the packet 115.

In some embodiments, a machine applies a security policy to a packet by encrypting the packet, or a portion of the packet, with a particular encryption method using a shared key. The third stage 103 shows that identified security policy A has been applied to the packet 115 to encrypt the payload of the packet 115. Finally, the fourth stage 104 shows that the machine 150 sends the packet 115 out of interface 140 to the network 120.

Although machine 150 is shown with a single interface to a single network 120, in some embodiments, machine 150 has multiple interfaces to multiple different networks. For example, in some embodiments, a machine may have a first interface to a private network and a second interface to a public network. The security policy tables of some embodiments store records for the multiple interfaces and the machine applies the security policies based on the incoming/outgoing second level address of an associated interface for each packet.

Figure 2:
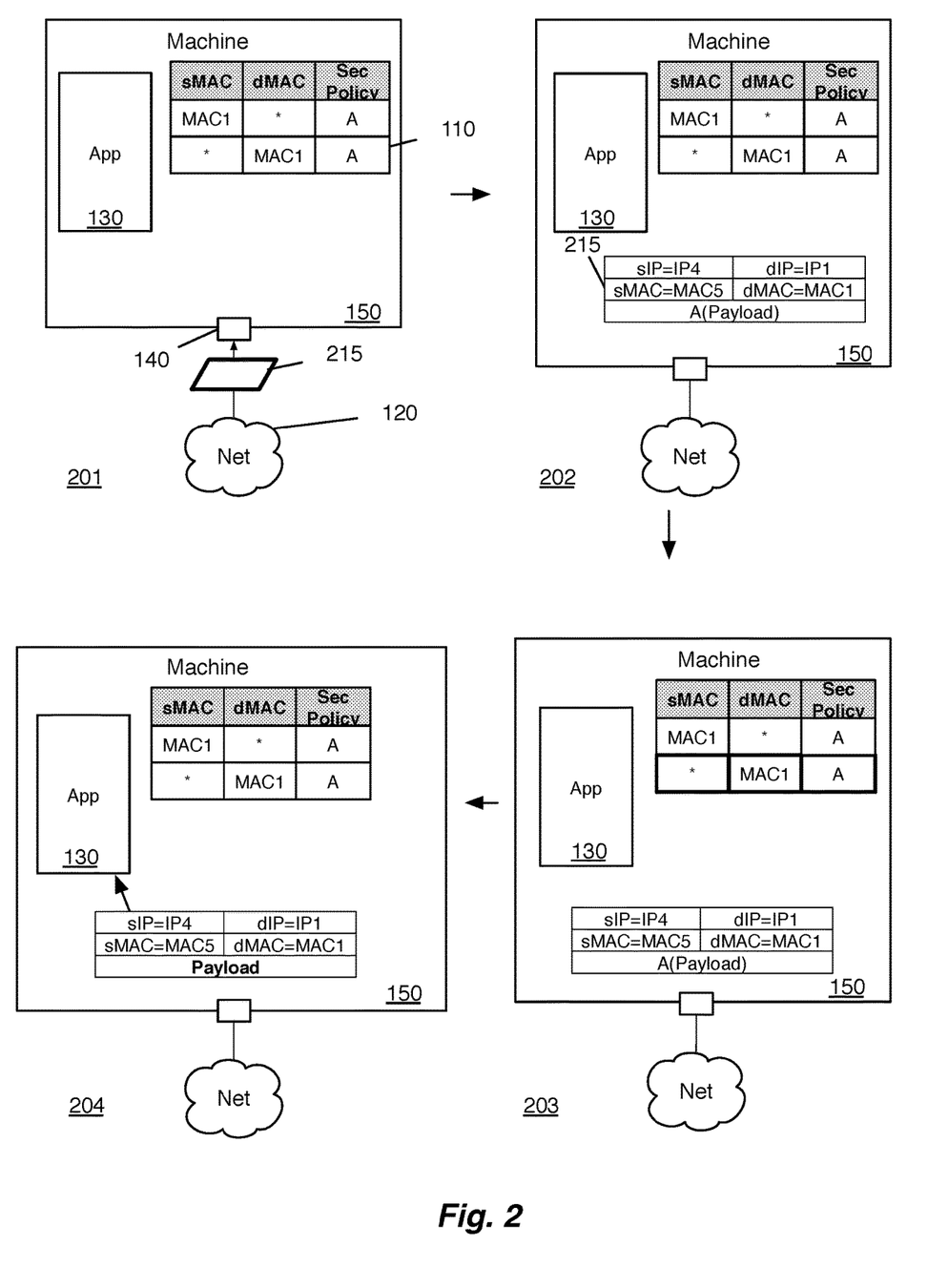
FIG. 2 illustrates an example of using security policies based on second level addresses to receive data messages.

When a machine receives secured communications from the network, a similar process is used by the machine to decrypt the packet before further processing the packet at the machine. FIG. 2 illustrates an example of using security policies based on second level addresses to receive data messages in four stages 201-204. The first stage 201 illustrates machine 150 of FIG. 1 receiving a packet from another machine (not shown) of the network 120 through interface 215.

In the second stage 202, the machine processes the received packet 215 to identify the source and destination IP and MAC addresses for the packet 215. Packet 215 was sent from a machine with an IP address of IP4. The source MAC address, MAC5, could be from the source machine, or from a router that forwarded the packet to the machine 150. The destination IP and MAC addresses correspond to the interface 140 through which the packet was received.

The third stage 203, like the second stage 102 of FIG. 1, shows that the machine 150 identifies a record from the security policy table 110 based on the destination MAC address (MAC1) of the packet 215, which specifies security policy A. Although in the examples of FIGS. 1 and 2, the same security policy (A) is applied to both incoming and outgoing packets, in some embodiments, different security policies are applied for incoming packets than for outgoing packets.

The fourth stage 204 shows that the machine has applied security policy A to the payload of packet 215 to decrypt the payload and restore the data of the packet. The packet is then processed normally by the machine and sent to application 130.

Figure 3:
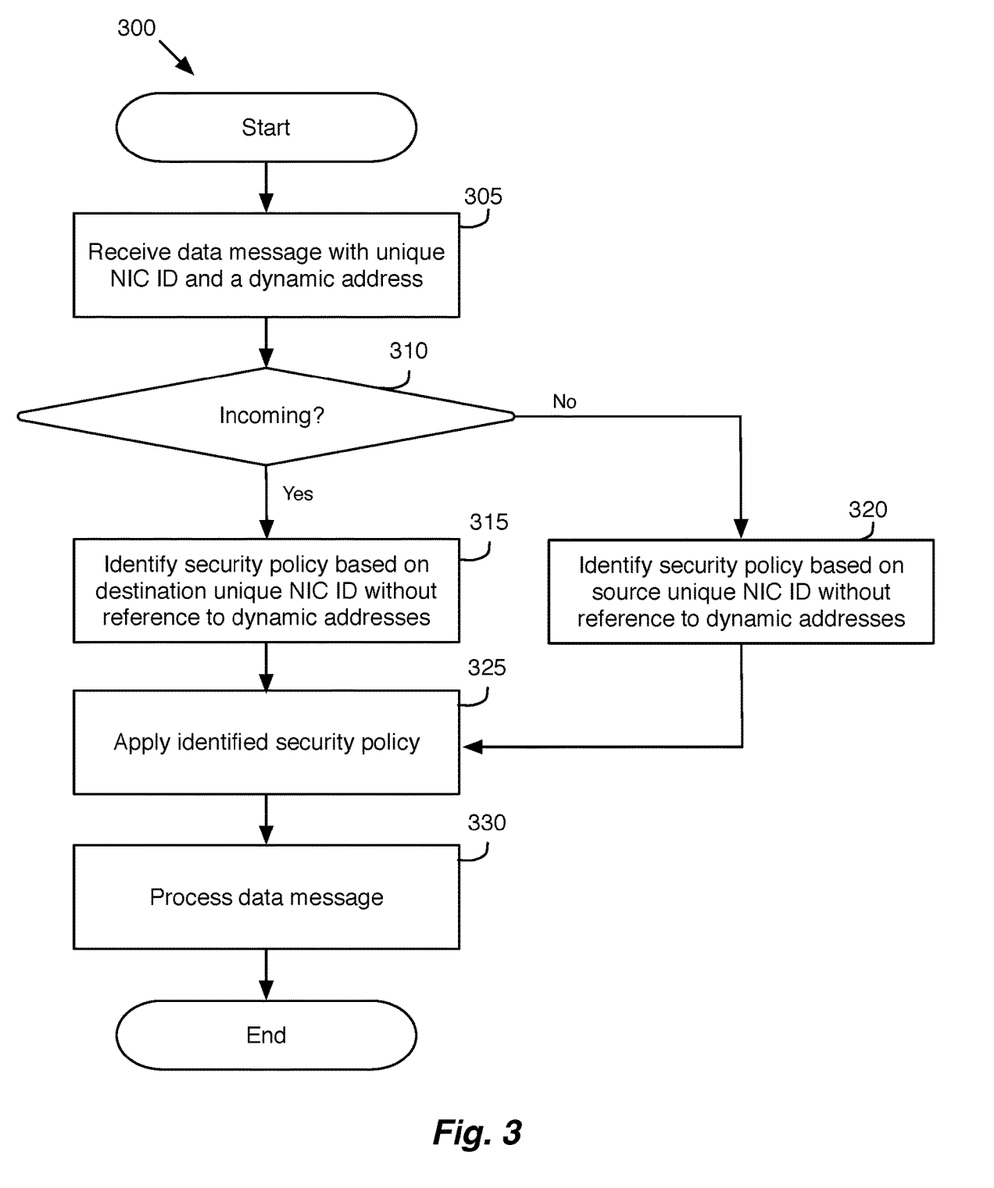
FIG. 3 conceptually illustrates a process for applying security policies based on a unique network interface controller (NIC) identification.

FIG. 3 conceptually illustrates a process for applying security policies based on a unique interface identification (e.g., network interface controller (NIC) ID, MAC address, vNIC ID, etc.), such as the second level addresses described above. The process 300 of some embodiments is performed by a machine (e.g., a physical machine, virtual machine, forwarding element, etc.) on a network that applies security policies to incoming and outgoing packets, similar to the machine described above with reference to FIGS. 1 and 2.

The process 300 starts when it receives (at 305) a packet with a unique interface ID and a dynamic address that are specific to a particular interface associated with the packet. In some cases, the unique interface ID is associated with a NIC through which the packet was received from a network. In other cases, the unique interface ID is associated with a NIC through which a machine or an application executing on the machine is to send the packet to reach a destination machine.

The process 300 determines (at 310) whether the packet is an incoming packet or an outgoing packet. When the process determines (at 310) that the packet is an incoming packet, the process identifies (at 315) a security policy based on a destination unique interface ID (e.g., destination MAC address) without reference to the dynamic address associated with the interface. The identified security policy describes a method for securing communication between the machine and another machine on the network. The security policies of some embodiments specify a shared security key and an encryption method for data messages between the machine and the network on the particular interface.

When the process 300 determines (at 310) that the packet is not an incoming packet (i.e., an outgoing packet), the process identifies (at 315) a security policy based on a source unique NIC ID (e.g., source MAC address) without reference to the dynamic address associated with the NIC.

The process 300 then applies (at 325) the identified security policy to the data message. In some embodiments, the process 300 applies the identified security policy by encrypting an outgoing data message (or decrypting an incoming data message) with a shared security key using an encryption method specified by the identified security policy.

The process 300 then processes (at 330) the packet. When the packet is an incoming packet, the process 300 of some embodiments processes the packet with an application that requested or is otherwise expecting the packet. When the packet is an outgoing packet, the process 300 of some embodiments forwards the packet along the interface associated with the addresses of the packet towards the destination of the packet. The process 300 then ends.

Figure 4A:
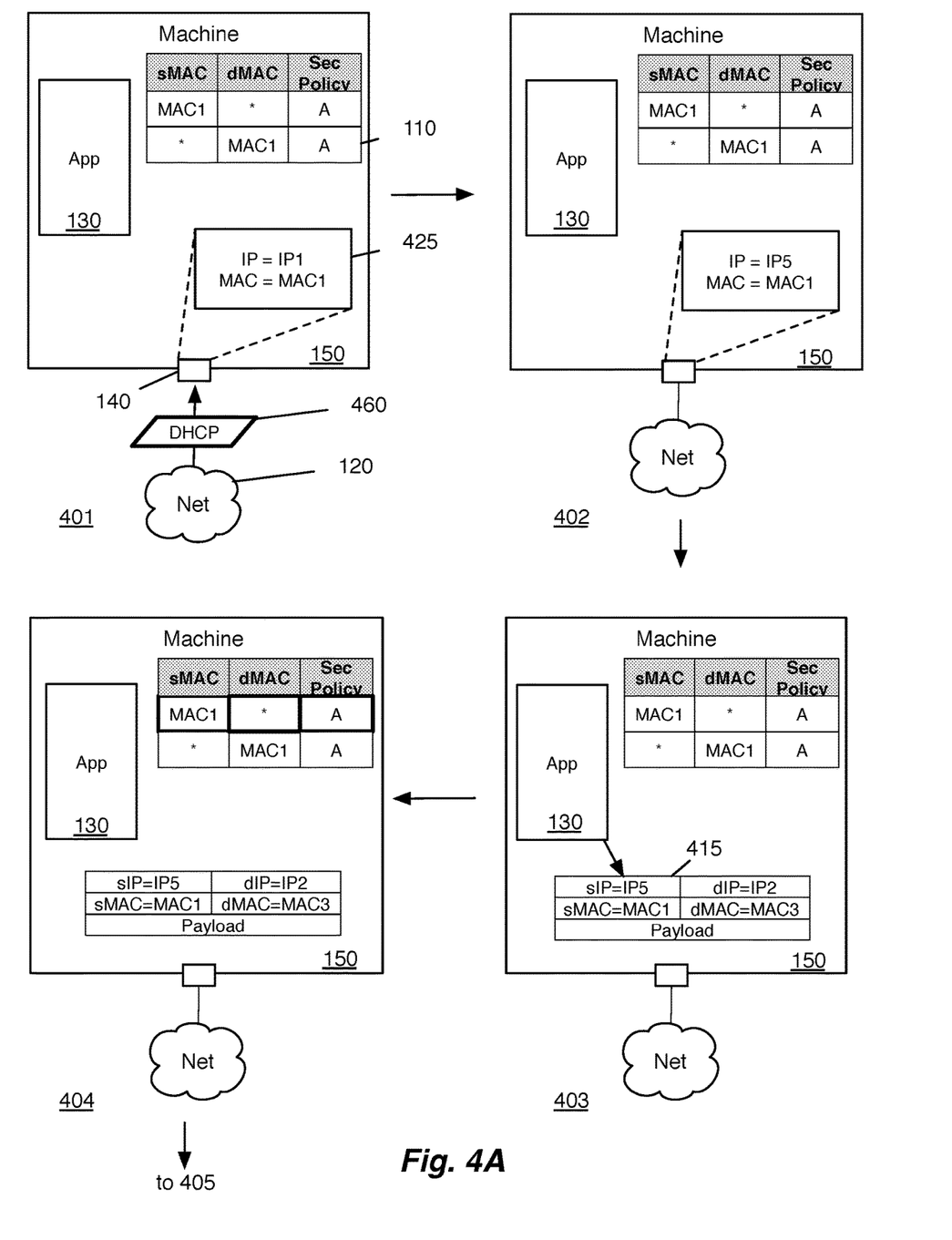
FIGS. 4A-B illustrate an example of using security policies based on second level addresses to send data messages at a machine with a dynamic IP address.
Figure 4B:
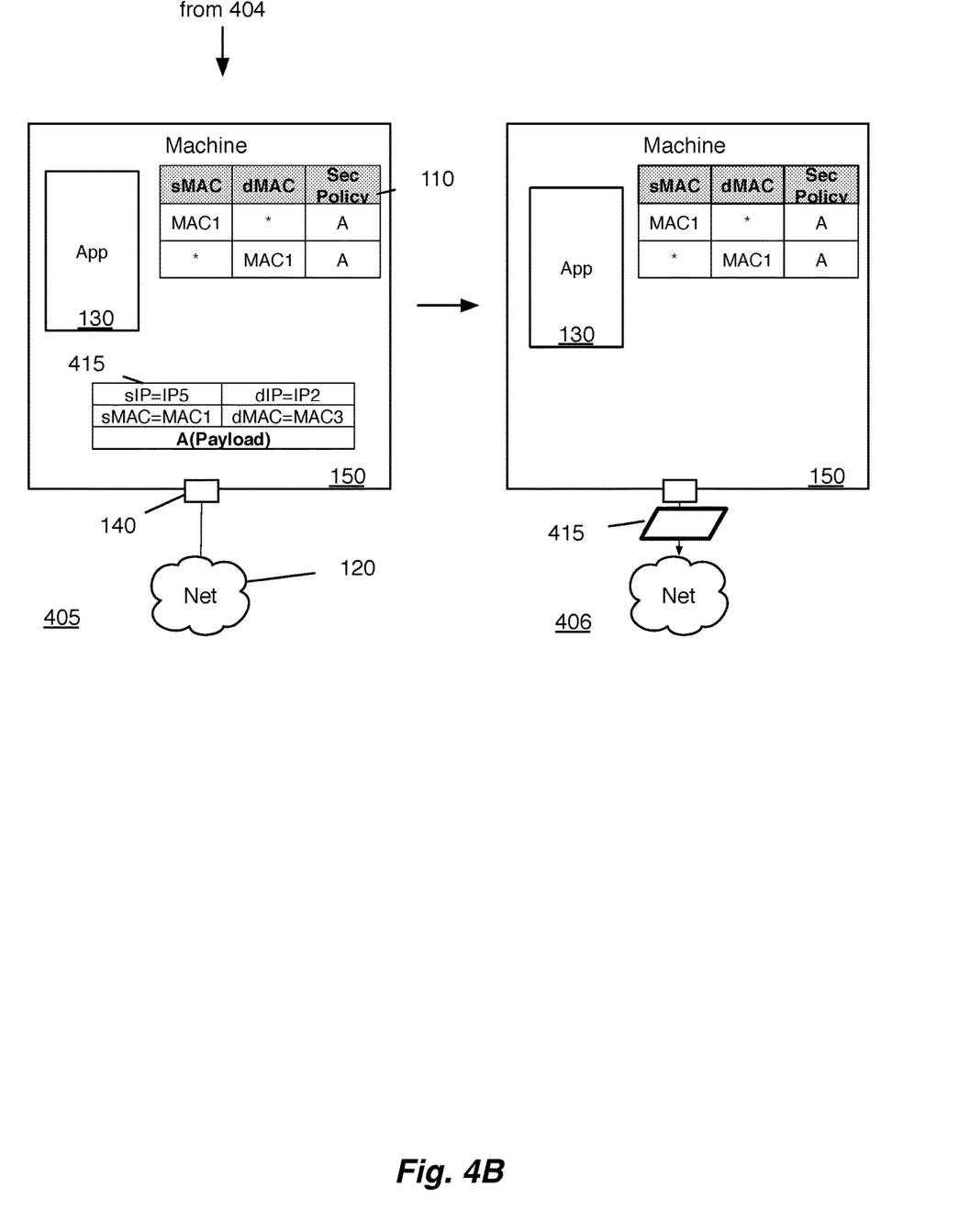

By applying security policies based on the second level addresses (e.g., unique NIC IDs), an administrator no longer needs to update the security policies at each machine when the first level dynamic address changes. FIGS. 4A-B illustrate an example of using security policies based on second level addresses to send data messages from a machine with a dynamic first level address in six stages 401-406. The example of this figure is similar to the example provided in FIG. 1, which applies security policies based on a MAC address of the packet and sends the packet on an interface to the network. However, FIGS. 4A-B also show that changes in the dynamic IP address of the machine do not affect the security policies of machine 150.

The first stage 401 shows machine 150 of FIG. 1 with interface 140, with an IP address of IP1, and a MAC address of MAC1. The first stage 401 also shows that machine 150 receives a DHCP configuration 460 from the network 120 (e.g., from a DHCP server). In the second stage 402, in response to the DHCP configuration 460, the IP address for interface 140 of machine 405 has changed from IP1 to IP5. As the MAC address is a unique and unchanging address associated with interface 140, the MAC address has not changed.

The third stage 403 illustrates that application 130 of machine 150 generates a packet 415 to be sent out on the network 120. In the fourth stage 404, the machine 150 identifies a record in the security policy table 110 that matches with the packet 415. In this example, the packet 415 has a source MAC address of MAC1 and a destination MAC address of MAC3.

Based on the source MAC address of the packet 415, the machine 150 matches the packet 415 with the first record of the security policy table 110. The first record identifies a security policy A to be applied to packets with a source MAC address of interface 140 (MAC1). By identifying the security policy based on the source MAC address, the changes in the IP address described in stages 401-402 do not affect the security processing of packets sent from (or received at) this interface of machine 150.

The fifth stage 405 shows that identified security policy A has been applied to the packet 415 to encrypt the payload of the packet 415. Finally, the sixth stage 406 shows that the machine 150 sends the packet 415 out of interface 140 to the network 120.

Figure 5A:
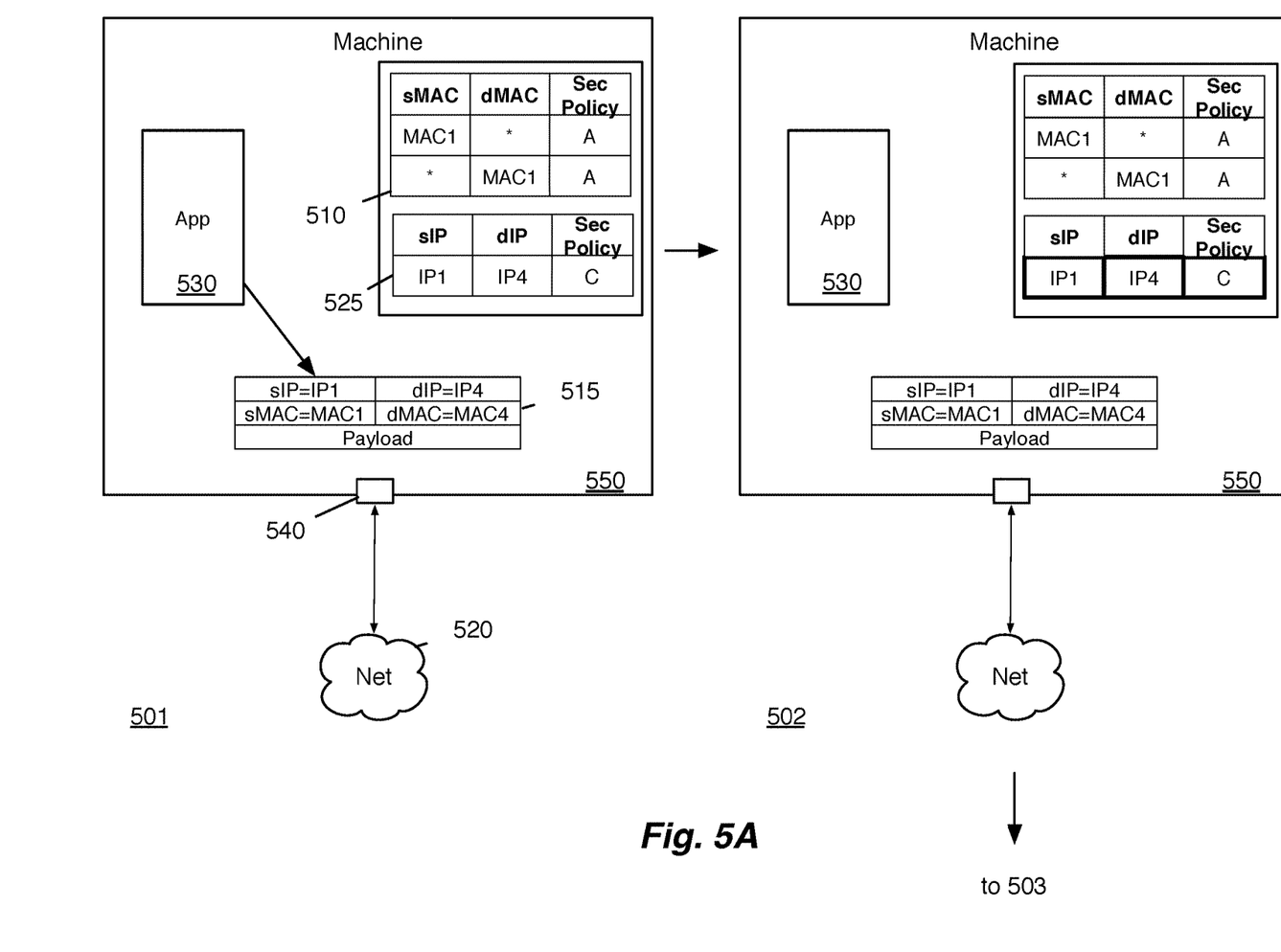
FIGS. 5A-B illustrate an example of processing data messages based on a hierarchy of security policies.
Figure 5B:
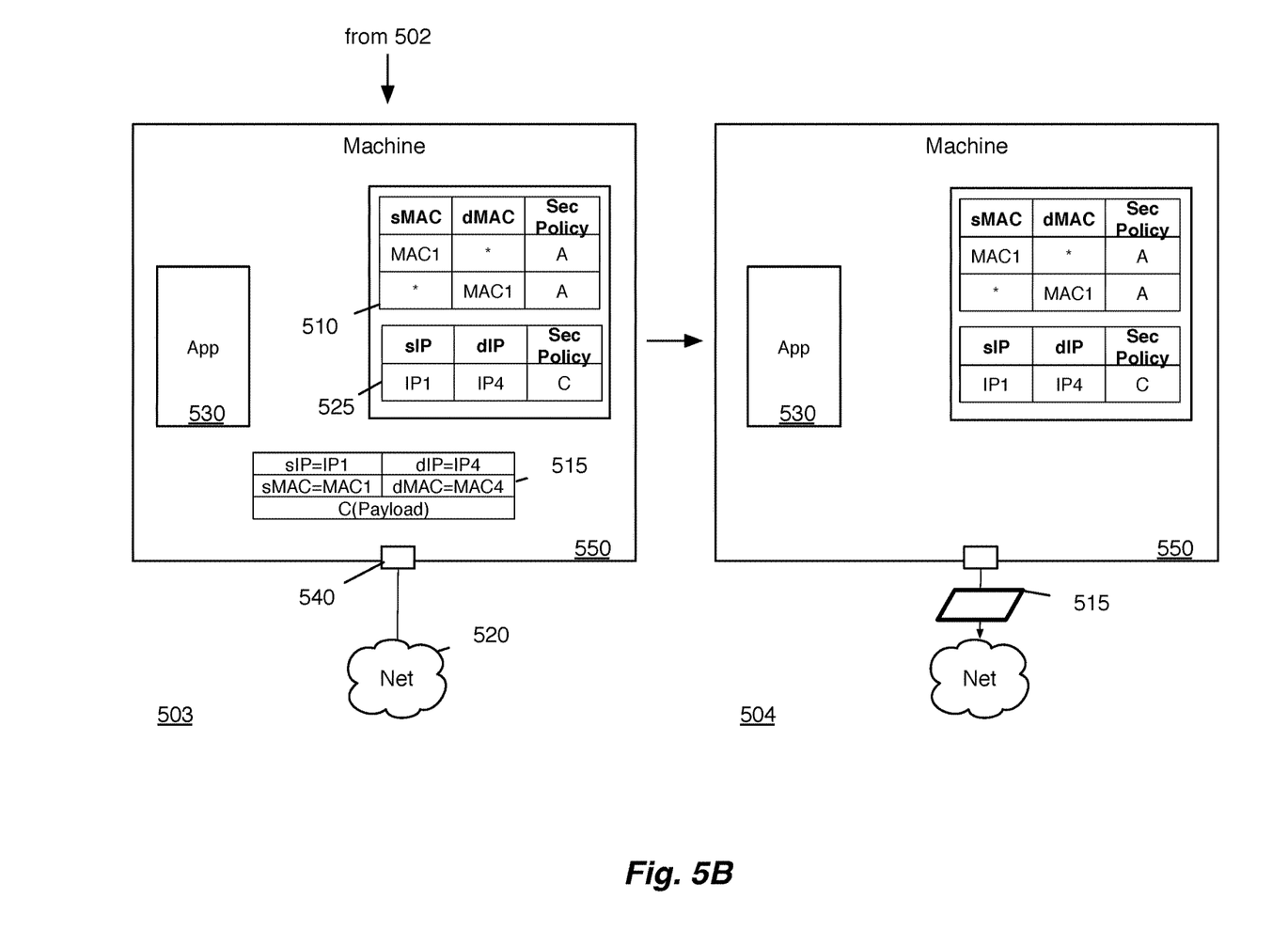

In some embodiments, rather than simply applying security policies to all data messages based on a second level address, the process applies different security policies to the data message based on a hierarchy of different level addresses associated with the packet. FIGS. 5A-B illustrate an example of processing data messages based on a hierarchy of security policies in four stage 501-504.

The first stage 501 shows that application 530 of machine 550 produces a packet 515 to be sent to a machine on the network 520 over interface 540. The packet 515 includes source IP and MAC addresses for interface 540, as well as destination IP and MAC addresses for a destination machine of the packet 515. Machine 550 includes a security policy table 510 that specifies security policies based on the MAC addresses. However, unlike previous examples described above, machine 550 also includes a second security policy table 525 that specifies security policies based on the IP address of a packet. The security policy table 525 of some embodiments is a standard IPSEC table.

In the second stage 502, the machine 550 identifies a record in the security policy tables 510 and 525 that matches with the packet 515. In this case, multiple addresses of the packet 515 can match on the records of security policy tables 510 and 525. Namely, the source MAC address of the packet matches with the first entry of the first security policy table 510, while the source and destination IP addresses match with the entry of the second security policy table 525. In some embodiments, the tables are arranged in a hierarchy, so that the machine first searches for matches in higher priority tables before searching in lower priority tables. In some embodiments, the more specific security policies (e.g., policies matching on both a source and destination IP address) have a higher priority. However, in some cases, security policies based on a MAC address will have a higher priority than security policies based on an IP address.

In this example, the IP security policy table 525 is a higher priority table than the MAC security policy table 510, so the record in the IP security policy table 525 is selected. The selected record indicates that security policy C should be applied to the packet.

The third stage 503 shows that the selected security policy (C) has been applied to the payload of the packet 515. In the fourth stage 504, the secured packet 515 is sent to the network 520 over interface 540.

Figure 6:
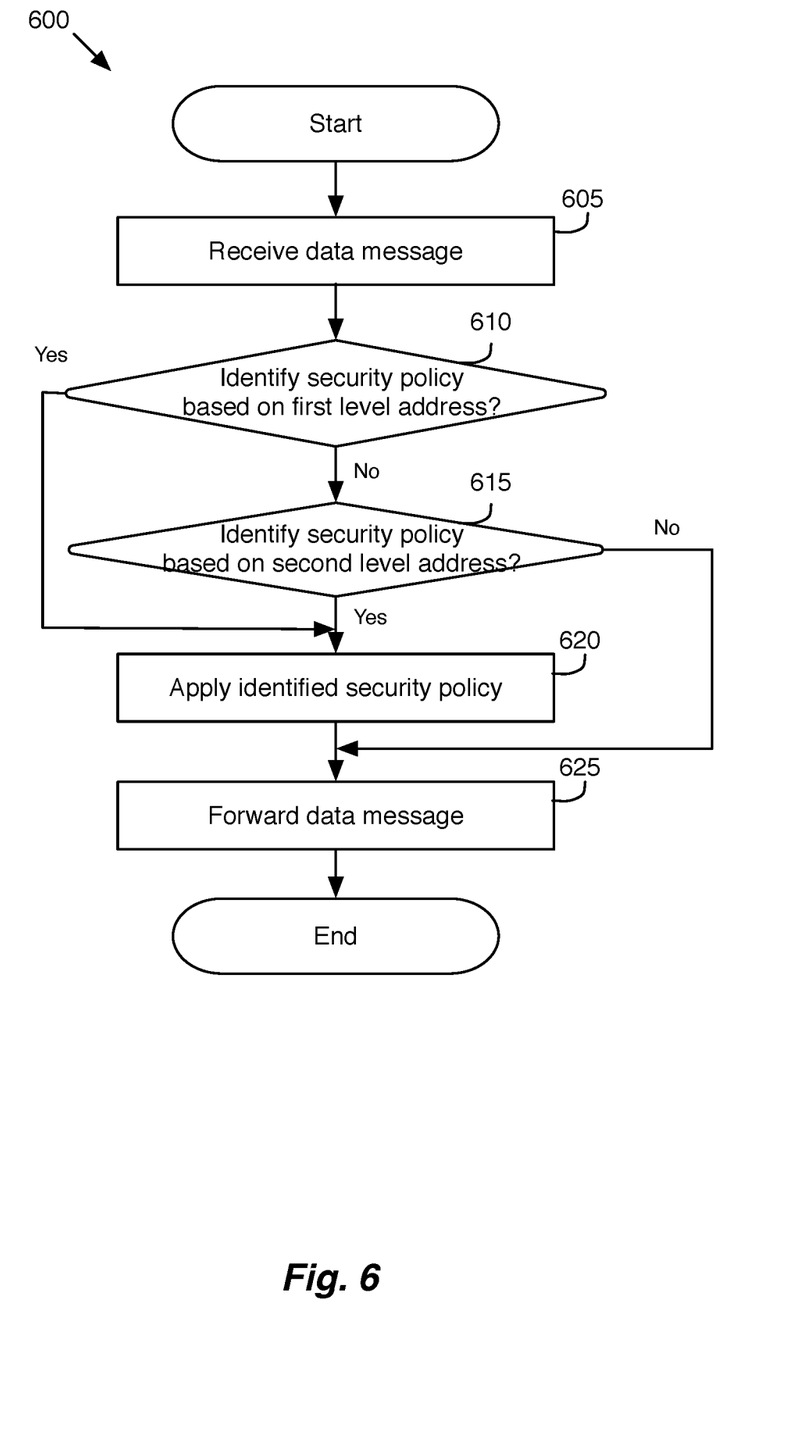
FIG. 6 conceptually illustrates a process for applying security policies based on a hierarchy of security policies.

FIG. 6 conceptually illustrates a process for applying security policies based on a hierarchy of security policies. The process 600 of some embodiments is performed by a machine (e.g., a physical machine, virtual machine, forwarding element, etc.) on a network that applies security policies data messages, similar to the machine described above with reference to FIGS. 5A-B.

The process 600 starts when it receives (at 605) a data message with different addresses. As described above, the data message may be an incoming or outgoing data message. The process 600 then determines (at 610) whether to identify a security policy based on a first level address (e.g., L3 address) of the data message. In some embodiments, determining whether to apply a security policy based on the first level address includes performing a lookup on a security table and determining whether a security policy for the particular first level address exists. When the process 600 determines (at 610) that a security policy should be applied based on the first level address (e.g., when the process identifies a security policy from the security table), the process 600 proceeds to 620, described below.

When the process 600 determines (at 610) that no security policy is identified based on the first level address, the process determines (at 615) whether to identify a security policy based on a second level address for the data message. When the process 600 determines (at 615) that no security policy is identified for the second level address of the data message, the process 600 proceeds to 625, described below.

When the process determines (at 610 or 615) that a security policy is identified for the data message (based on either the higher-level address or the lower-level address of the data message), the process 600 applies (at 620) the identified security policy to the data message. As described above, the process of some embodiments applies the security policy by encrypting (or decrypting) at least a portion of the data message using a shared security key and a particular encryption method.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

II. Electronic System

Figure 7:
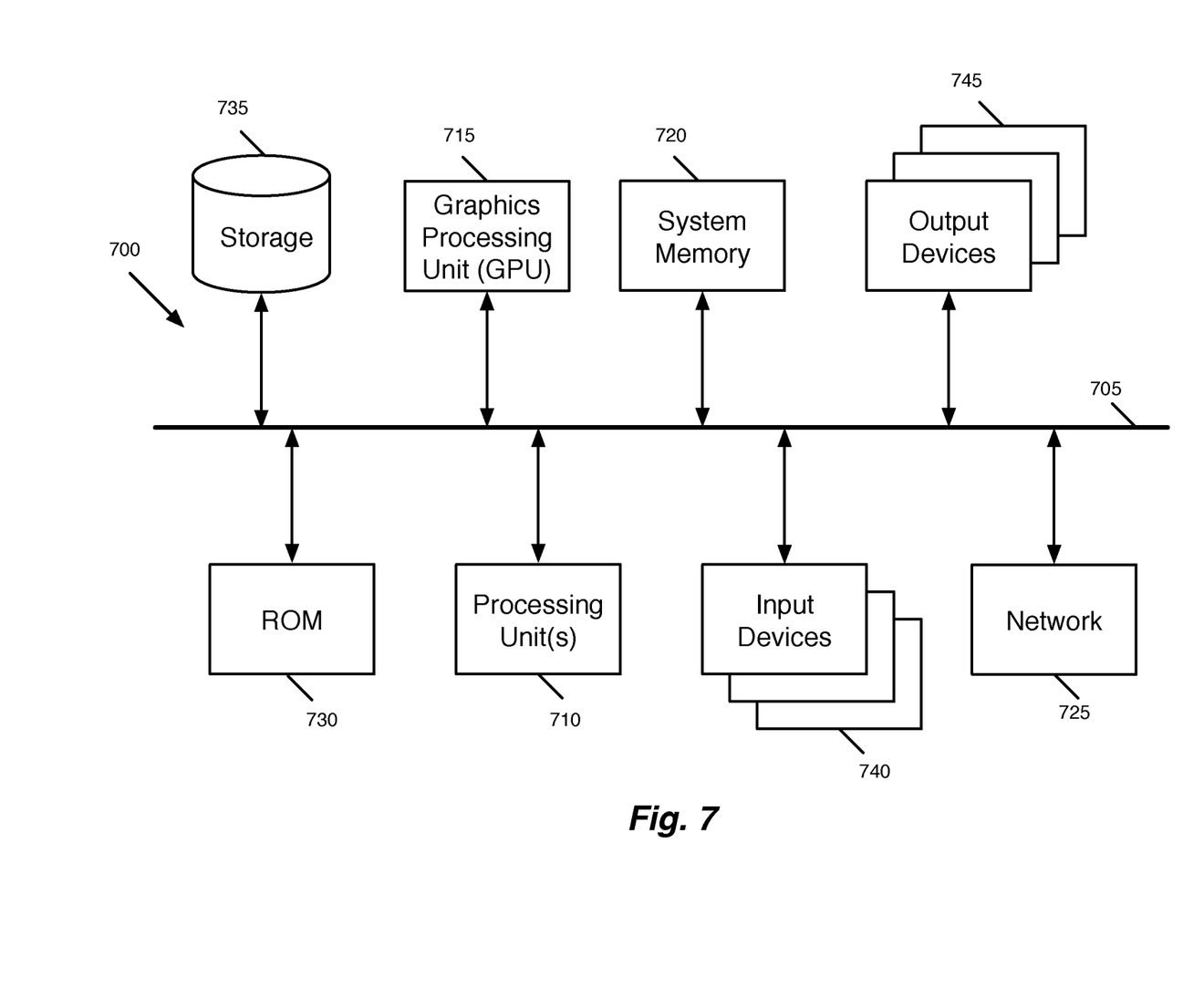
FIG. 7 conceptually illustrates a computer system with which some embodiments of the invention are implemented.

FIG. 7 conceptually illustrates a computer system 700 with which some embodiments of the invention are implemented. The computer system 700 can be used to implement any of the above-described hosts, controllers, and managers. As such, it can be used to execute any of the above described processes. This computer system includes various types of non-transitory machine readable media and interfaces for various other types of machine readable media. Computer system 700 includes a bus 705, processing unit(s) 710, a system memory 725, a read-only memory 730, a permanent storage machine 735, input machines 740, and output machines 745.

The bus 705 collectively represents all system, peripheral, and chipset buses that communicatively connect the numerous internal machines of the computer system 700. For instance, the bus 705 communicatively connects the processing unit(s) 710 with the read-only memory 730, the system memory 725, and the permanent storage machine 735.

From these various memory units, the processing unit(s) 710 retrieve instructions to execute and data to process in order to execute the processes of the invention. The processing unit(s) may be a single processor or a multi-core processor in different embodiments. The read-only-memory (ROM) 730 stores static data and instructions that are needed by the processing unit(s) 710 and other modules of the computer system. The permanent storage machine 735, on the other hand, is a read-and-write memory machine. This machine is a non-volatile memory unit that stores instructions and data even when the computer system 700 is off. Some embodiments of the invention use a mass-storage machine (such as a magnetic or optical disk and its corresponding disk drive) as the permanent storage machine 735.

Other embodiments use a removable storage machine (such as a floppy disk, flash drive, etc.) as the permanent storage machine. Like the permanent storage machine 735, the system memory 725 is a read-and-write memory machine. However, unlike storage machine 735, the system memory is a volatile read-and-write memory, such a random access memory. The system memory stores some of the instructions and data that the processor needs at runtime. In some embodiments, the invention's processes are stored in the system memory 725, the permanent storage machine 735, and/or the read-only memory 730. From these various memory units, the processing unit(s) 710 retrieve instructions to execute and data to process in order to execute the processes of some embodiments.

The bus 705 also connects to the input and output machines 740 and 745. The input machines enable the user to communicate information and select commands to the computer system. The input machines 740 include alphanumeric keyboards and pointing machines (also called "cursor control machines"). The output machines 745 display images generated by the computer system. The output machines include printers and display machines, such as cathode ray tubes (CRT) or liquid crystal displays (LCD). Some embodiments include machines such as a touchscreen that function as both input and output machines.

Finally, as shown in FIG. 7, bus 705 also couples computer system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of computer system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "host", "machine", "server", "processor", and "memory" all refer to electronic or other technological machines. These terms exclude people or groups of people. For the purposes of the specification, the terms display or displaying means displaying on an electronic machine. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, it should be understood that the invention can be embodied in other specific forms without departing from the spirit of the invention. A number of the figures (e.g., FIGS. 3 and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. In view of the foregoing, it should be understood that the invention is not to be limited by the foregoing illustrative details, but rather is to be defined by the appended claims.

I claim:

1. A method for securing communication of data messages on a host computer executing at least one particular machine, the method comprising:
    at the host computer on which the particular machine executes:
        storing a plurality of security policies comprising a first security policy associated with a fixed MAC (media access control) address and a second security policy that is associated with an IP address, wherein the first security policy is stored with a higher priority than the second security policy as the first security policy is associated with the fixed MAC address;
        receiving a particular data message associated with the particular machine;
        comparing a MAC address and an IP address stored in a header of the particular data message with MAC and IP addresses of the security policies stored on the host computer to identify a security policy for securing the communication of the particular data message; and
        applying the identified security policy to the particular data message.

2. The method of claim 1, wherein the IP address is a destination IP address, and the fixed MAC address is the destination MAC address.

3. The method of claim 1, wherein applying the identified security policy comprises using an encryption key specified by the identified policy to encrypt at least a part of the particular data message.

4. The method of claim 1, wherein applying the identified security policy comprises using an encryption key specified by the identified policy to decrypt at least a part of the particular data message.

5. The method of claim 1, wherein the particular machine is a virtual machine comprising a virtual network interface controller (vNIC).

6. The method of claim 1, wherein the particular data message is one of an Ethernet frame, IP packet, TCP segment, and UDP datagram.

7. The method of claim 1, wherein the particular data message is sent to or from the particular machine.

8. The method of claim 1, wherein identifying the security policy comprises a identifying an encryption key.

9. A non-transitory machine readable medium storing a program which when executed by at least one processing unit of a host computer secures communication of data messages on the host computer executing at least one particular machine, the program comprising sets of instructions for:
- storing a plurality of security policies comprising a first security policy associated with a fixed MAC (media access control) address and a second security policy that is associated with an IP address, wherein the first security policy is stored with a higher priority than the second security policy as the first security policy is associated with the fixed MAC address;
- receiving a particular data message associated with the particular machine;
- comparing a MAC address and an IP address stored in a header of the particular data message with MAC and IP addresses of the security policies stored on the host computer to identify a security policy for securing the communication of the particular data message; and
- applying the identified security policy to the particular data message.

10. The non-transitory machine readable medium of claim 9, wherein the address is a source IP address and the fixed MAC address is a source MAC address.

11. The non-transitory machine readable medium of claim 9, wherein the identified security policy comprises an encryption key, wherein the set of instructions for applying the identified security policy comprises a set of instructions for using the encryption key to encrypt at least a part of the particular data message.

12. The non-transitory machine readable medium of claim 9, wherein the identified security policy comprises an encryption key, wherein the set of instructions for applying the identified security policy comprises a set of instructions for using the encryption key to decrypt at least a part of the particular data message.

13. The non-transitory machine readable medium of claim 9, wherein the particular data message is sent to or from the particular machine.

* * * * *